United States Patent [19]

Shibano et al.

[11] Patent Number: 4,990,758
[45] Date of Patent: Feb. 5, 1991

[54] CARD CONNECTOR

[75] Inventors: Yasuji Shibano, Izumisano; Toshio Sazaki, Yao; Akira Yamamoto, Yamatotakada, all of Japan

[73] Assignee: Hosiden Electronics Co., Ltd., Yao, Japan

[21] Appl. No.: 328,546

[22] Filed: Mar. 24, 1989

[30] Foreign Application Priority Data

Apr. 4, 1988 [JP] Japan .................... 63-83440
Apr. 4, 1988 [JP] Japan .................... 63-83441

[51] Int. Cl.⁵ .............................................. G06K 7/08
[52] U.S. Cl. ..................................... 235/449; 235/479; 235/492; 235/441
[58] Field of Search ................ 235/449, 441, 479, 492

[56] References Cited

U.S. PATENT DOCUMENTS 4,810,863 3/1989 Kachi ..................... 235/441

Primary Examiner—Harold Pitts
Attorney, Agent, or Firm—Jones, Tullar & Cooper

[57] ABSTRACT

A card connector capable of preventing the contact pieces from applying a resilient contact force to a card when the card is inserted in and removed from the card connector. Thus, the card may be readily inserted and removed with a small force. If the card is not inserted in a normal posture with the wrong side up or with the rear end first, the card is automatically discharged from the card connector.

8 Claims, 15 Drawing Sheets

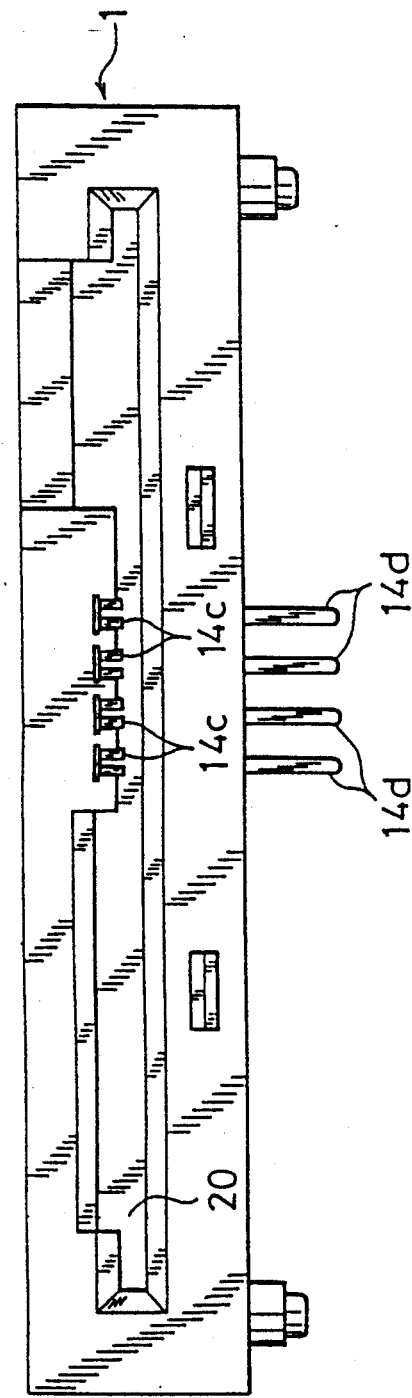
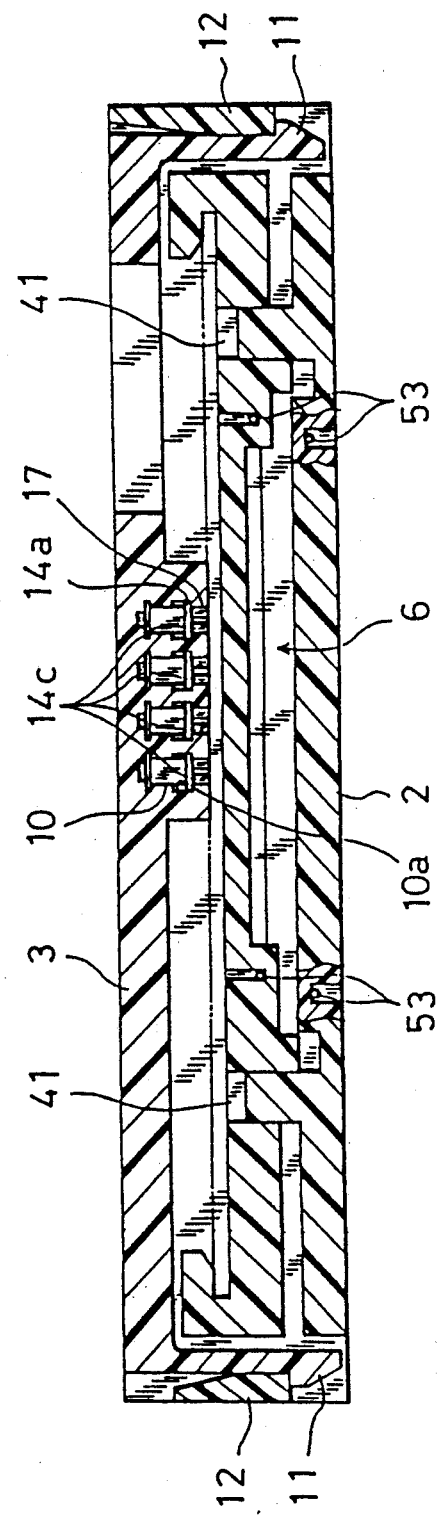

CARD CONNECTOR

Background of the Invention

1. Field of the Invention

The present invention relates to a card connector used for a card, e.g., a magnetic card or an IC card such as a credit card or a cash card, capable of automatically discharging the card if erroneously inserted into the card connector. Also, the present invention relates to such card connector having a magnetic head travelling mechanism for scanning a magnetic stripe, to be particularly used for a magnetic card.

2. Description of the Prior Art

There is known a card connector provided with an automatic card discharging function for discharging a card if the same is inserted into the card connector with the wrong side up or with the rear side first (hereinafter referred to as erroneous insertion). Such conventional card connector may achieve the automatic discharging function only for a card provided with an electric or mechanical means for preventing the erroneous insertion.

Nowadays, cards of a variety types appear on the market in a transition period where magnetic cards and IC cards are apt to be unified. Accordingly, it is desired to automatically discharge, from the card connector, a card if erroneously inserted, even though the card has no erroneous insertion preventive means. Such a demand is also applied to a card connector having a magnetic head travelling mechanism for scanning a magnetic stripe.

In conventional card connectors, however, the automatic discharging function does not work for a card having no erroneous insertion preventive means. Thus, the demand above-mentioned has not been satisfied so far.

SUMMARY OF THE INVENTION

In view of the foregoing, the present invention is proposed with the main object of providing a card connector of which automatic discharging function works if the card is erroneously inserted, regardless of the card type with or without erroneous insertion preventive means, as far as the card has predetermined shape and sizes.

It is another object of the present invention to provide a card connector having a simple and economical magnetic head travelling mechanism adapted such that neither erroneous reading nor erroneous writing is made by the magnetic head, capable of achieving the main object above-mentioned.

To achieve the objects above-mentioned, the card connector in accordance with a first embodiment of the present invention has: a slider adapted to be pushed from the advance position to the retreat position thereof by a card when the card is inserted into the set position along the card inserting and removing passage; an engagement pin adapted to be engaged with the slider to hold the same at the retreat position; and springs for normally biasing the slider in the advancing direction, and is characterized by comprising:

card detector means for detecting that the card has been inserted into the set position;

card posture judging means for detecting that the card is not in a normal posture after the insertion of the card into the set position has been detected by the card detector means; and an actuator for disengaging the engagement pin from the slider if the card posture judging means detects that the card has not been inserted in the normal posture.

According to the card connector having the arrangement above-mentioned, if the card is not in the normal posture after the insertion of the card to the set position has been detected, the engagement pin is disengaged from the slider and the slider is advanced by the spring loads, thereby to discharge the card from the card connector. Accordingly, the card may be automatically discharged from the card connector if erroneously inserted, regardless of the card type with or without the erroneous insertion preventive means. Further, such card discharge is carried out by the spring loads stored at the time when the card is inserted. This eliminates the need of use of a drive source such as a motor. This lowers the number of the component elements required, thereby to reduce the cost.

To achieve the objects of the present invention, the card connector in accordance with a second embodiment of the present invention has: a slider adapted to be pushed from the advance position to the retreat position thereof by a card when the card is inserted into the set position; an engagement pin adapted to be engaged with the slider to hold the same at the retreat position; and springs for normally biasing the slider in the advancing direction, and is characterized by comprising:

card posture judging means for detecting that the card inserted into the set position is not in a normal posture; and an actuator for disengaging the engagement pin from the slider if the card posture judging means detects that the card has not been inserted in the normal posture.

According to the card connector having the arrangement above-mentioned, only when the card inserted in the set position is in the normal posture, the engagement pin is engaged with the slider, and if the card is erroneously inserted, the engagement pin is not engaged with the slider. Accordingly, if the card is not in the normal posture, the force of pushing the card is released to automatically discharge the same from the card connector. Accordingly, the card may be automatically discharged if erroneously inserted, regardless of the card type with or without the erroneous insertion preventive means, likewise in the card connector of the first embodiment. Also, the number of the component elements required may be lowered, thereby to reduce the cost.

The card connector in accordance with a third embodiment of the present invention has the component elements of the card connector in accordance with the first embodiment of the present invention, and is characterized by comprising a magnetic head travelling mechanism which comprises:

a travelling body held by guide rods in a forwardly and reversely movable manner;

a magnetic head attached to the travelling body through a spring plate;

a card inserting and removing passage for a card with a magnetic stripe, this passage being adapted to face on the scanning plane of the magnetic head formed at the time when the travelling body travels;

a wire having a leading starting end parallel with the guide rods, the wire being lead from the travelling body;

a turning pulley on which the wire is wound at the intermediate portion thereof, causing the wire to be turned;

a take-up pulley on which the wire is wound at the terminal end thereof and to which the terminal end is secured;

a gear reduction mechanism connected to the take-up pulley;

a resilient member for biasing the take-up pulley in the wire take-up direction through the gear reduction mechanism;

a control member swingingly held by the travelling body and having engagement ends adapted to be engaged with the end surface of the card inserted into the card inserting and removing passage; and a member disposed in the vicinity of the forward movement limit of the travelling body for pushing up the control member to disengage the engagement ends thereof from the card end surface;

the card inserting and removing passage of the magnetic head travelling mechanism being continuous on the card inserting and removing passage of the card connector.

According to the card connector having the arrangement above-mentioned, the magnetic head travels by a spring load presenting a constant resilient energy at all times. Accordingly, the scanning speed of the magnetic head is constant so that there is no possibility of erroneous reading and erroneous writing. Further, since a motor is not used, the magnetic head travelling mechanism is simplified. Accordingly, the addition of such simplified magnetic head travelling mechanism does not cause an inconvenience. Thus, the card connector of this embodiment may achieve the same operational effects as those of the card connector of the first embodiment.

Other features and effects of the present invention will be apparent from the following description with reference to the attached drawings.

BRIEF DESCRIPTION OF THE DRAWINGS

FIG. 3 is a front view of the assembled card connector of FIG. 1;

FIG. 4 is a section view taken along the line IV—IV in FIG. 2;

DETAILED DESCRIPTION OF THE PREFERRED EMBODIMENTS

Figure 1:
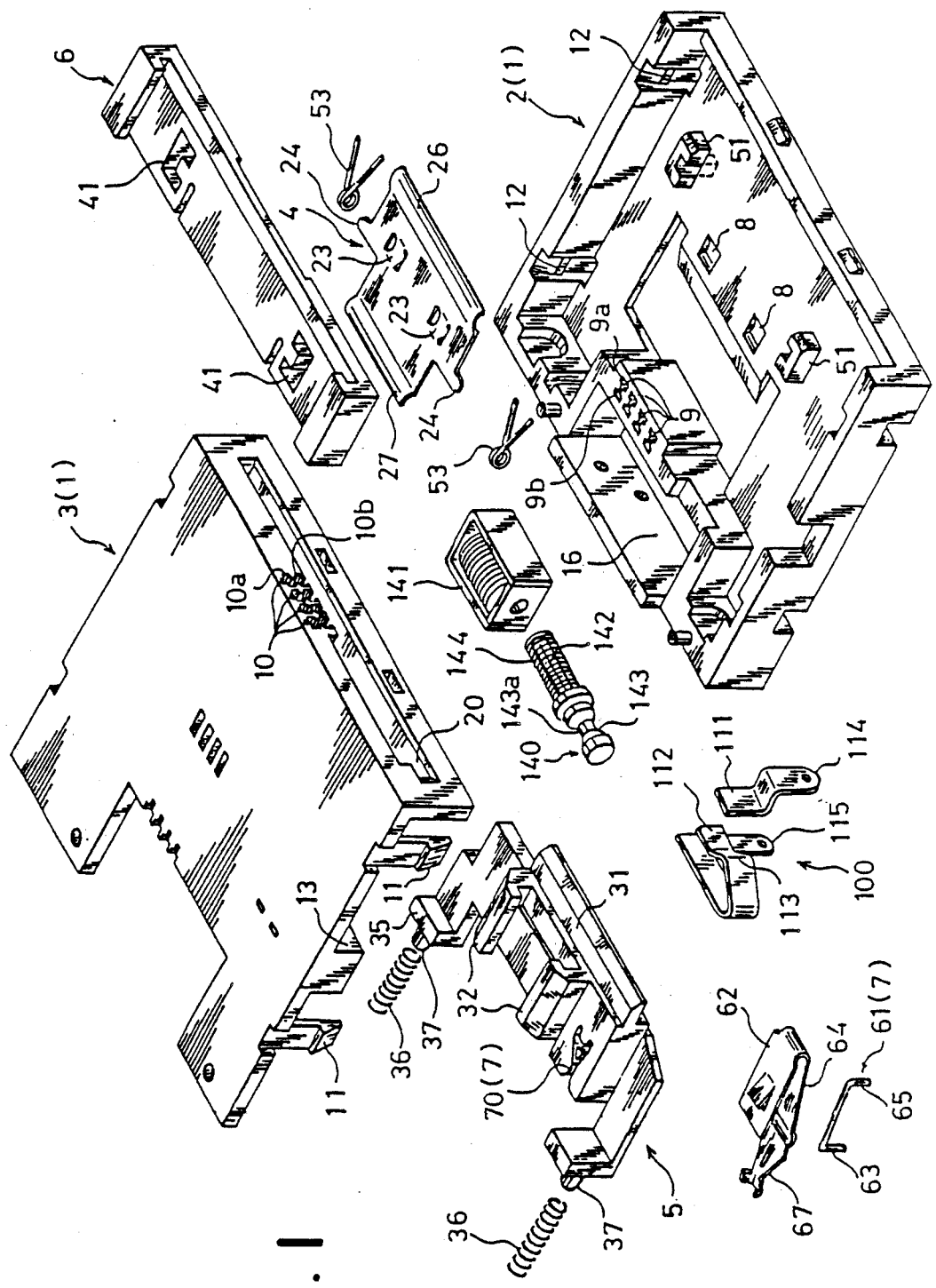
FIG. 1 is an exploded perspective view of a card connector in accordance with a first embodiment of the present invention.

As shown in FIG. 1 to FIG. 9, FIG. 11 and FIG. 12, the card connector in accordance with the first embodiment of the present invention includes, as basic component elements, a connector body 1 having a body 2 and an upper cover 3, a swing member 4, a slider 5, a lifting and lowering member 6 and a lock mechanism 7.

The body 2 is provided in the rear portion thereof with four contact piece insertion through-holes 9 pierced in the depth direction of the body 2. Each of the holes 9 is provided at the front and rear sides thereof with contact piece insertion grooves 9a, 9b with a space provided therebetween.

The upper cover 3 is provided in the center portion thereof with four contact piece insertion holes 10. Each of the holes 10 is provided at the upper and lower portions thereof with contact piece insertion grooves 10a, 10b.

When the upper cover 3 is assembled with the body 2, the contact piece insertion holes 9 are opposite to the contact piece insertion holes 10 and the contact piece insertion grooves 9a, 9b are opposite to the contact piece insertion grooves 10a, 10b, respectively. The upper cover 3 is provided at both lateral walls thereof with engagement pieces 11. By fitting these engagement pieces 11 to portions to be engaged 12 formed in both lateral walls of the body 2, the body 2 is assembled with the upper cover 3.

The card connector also includes long contact pieces 14 and short contact pieces 15.

Figure 6A:
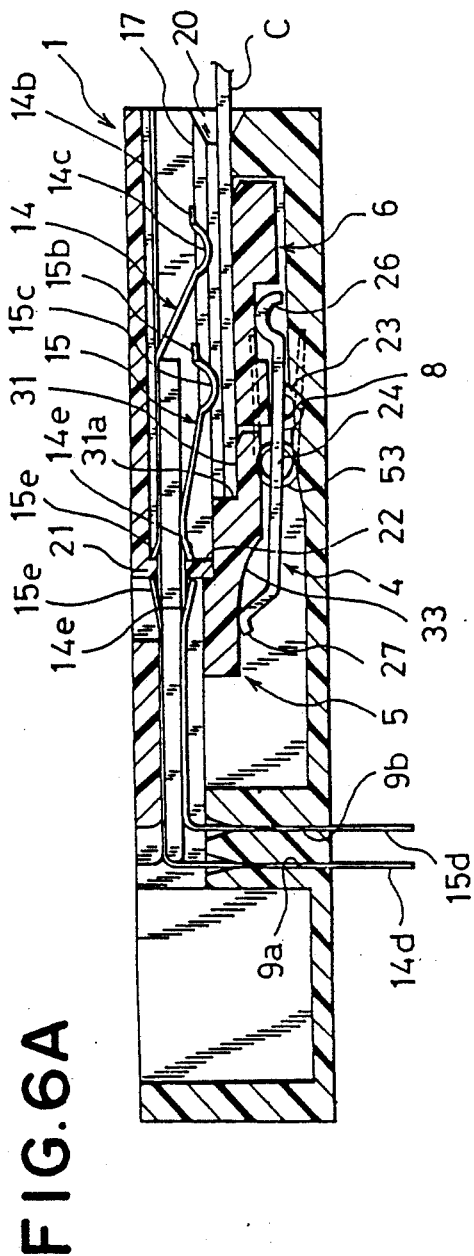
FIG. 6A is a section view of main portions of the card connector of FIG. 1, illustrating the state where a card is initially inserted.

As shown in FIG. 2, FIG. 4, FIG. 6A and FIG. 6B, each long contact piece 14 is provided at the tip thereof with a curved contact 14c, and the intermediate and tip portions of each contact piece 14 are made wider than other portions thereof. The intermediate wider portions 14a are inserted into the contact piece insertion grooves 10a. As shown in FIG. 6A, the tip portions 14b are resiliently hooked on stepped portions 17 of the upper cover 3 such that a pre-load is applied to the contacts 14c. The long contact pieces 14 are inserted into the contact piece insertion grooves 10a through a card inserting and removing port 20 formed in the upper cover 3 at the front wall thereof. After the long contact pieces 14 have been inserted, lead portions 14d thereof are turned downward, causing the lead portions 14d to project downward from the body 2.

The short contact pieces 15 have substantially the same arrangement as that of the long contact pieces 14.

A pre-load is applied to the contacts 15c. The short contact pieces 15 have lead portions 15d which are formed by turning the contact pieces 15 downward after insertion. It is here noted that the short contact pieces 15 are inserted into the lower insertion grooves 10b of the insertion holes 10.

Figure 6B:
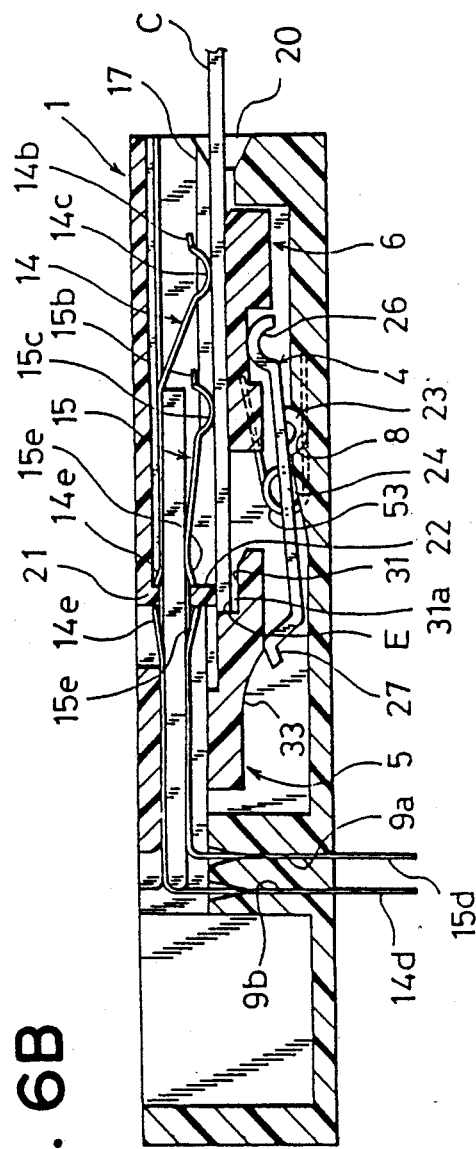
FIG. 6B is a section view of main portions of the card connector of FIG. 1, illustrating the state where the card is set.

As shown in FIG. 6A and FIG. 6B, the long contact pieces 14 and the short contact pieces 15 are provided at the centers thereof with cut-raised claws 14e, 15e, respectively. These cut-raised claws 14e, 15e are engaged with engagement portions 21, 22 of the upper cover 3, thereby to prevent the contact pieces 14, 15 from coming off from the upper cover 3.

The card inserting and removing port 20 has a height slightly greater than the thickness of a card C. Accordingly, when inserted into the card inserting and removing port 20, the card C may be vertically movable slightly.

The swing member 4 is made of a metallic plate punched into a predetermined shape and has a great rigidity. The swing member 4 is provided at both ends thereof with outward projections 24, and substantially at the longitudinal center portion thereof with downward projecting swing shaft portions 23. The swing member 4 is assembled with the body 2 by fitting these swing shaft portions 23 into concave holding portions 8 formed in the bottom of the body 2. Accordingly, the swing member 4 is vertically swingable around the fitting portions of the swing shaft portions 23 in the holding members 8. The swing member 4 also has one swing end 26 and the other swing end 27 of which tops are projected upward in the form of a circular arc or a triangle.

Figure 2:
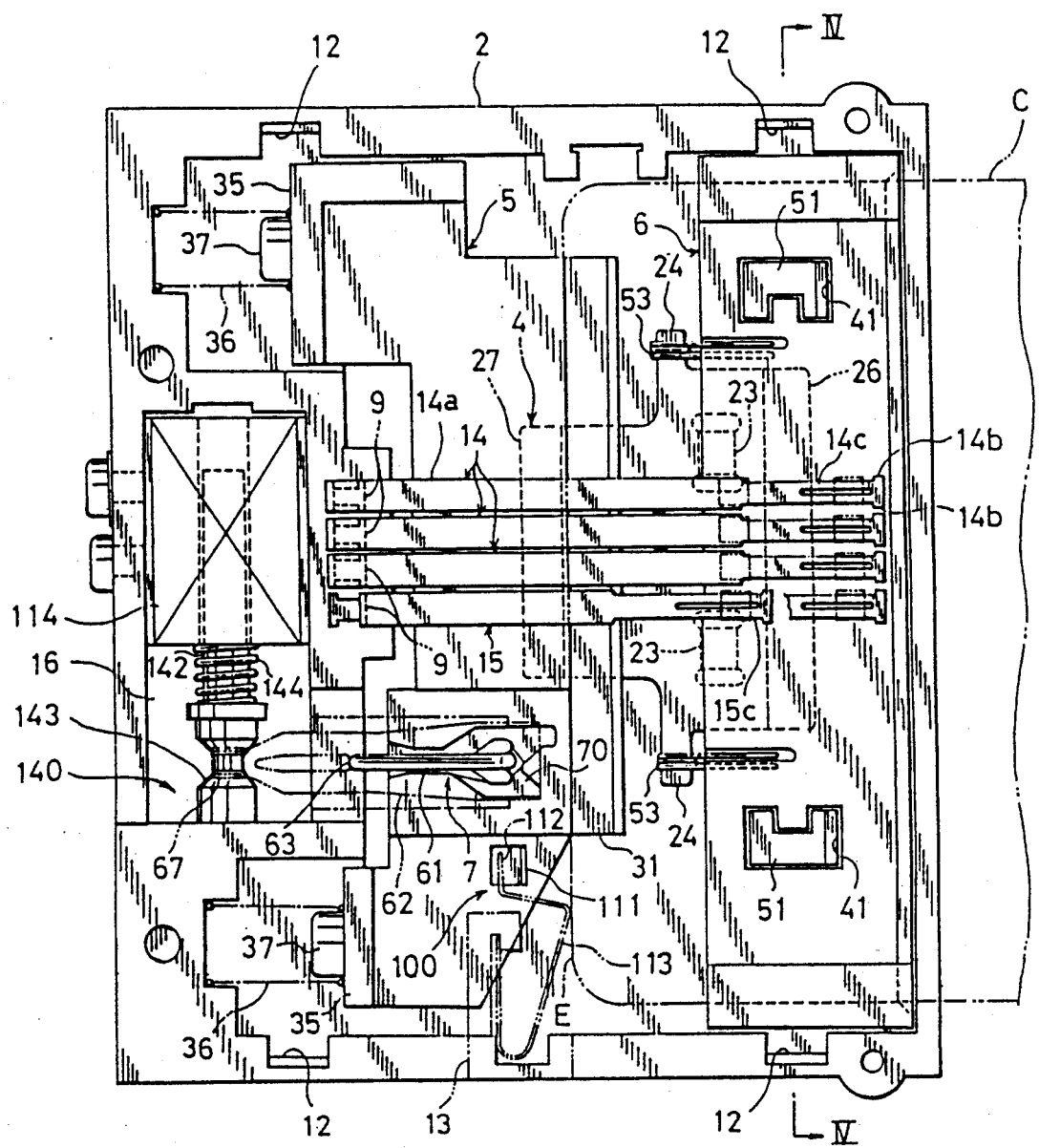
FIG. 2 is a plan view of the assembled card connector of FIG. 1 with the upper cover removed.
Figure 5:
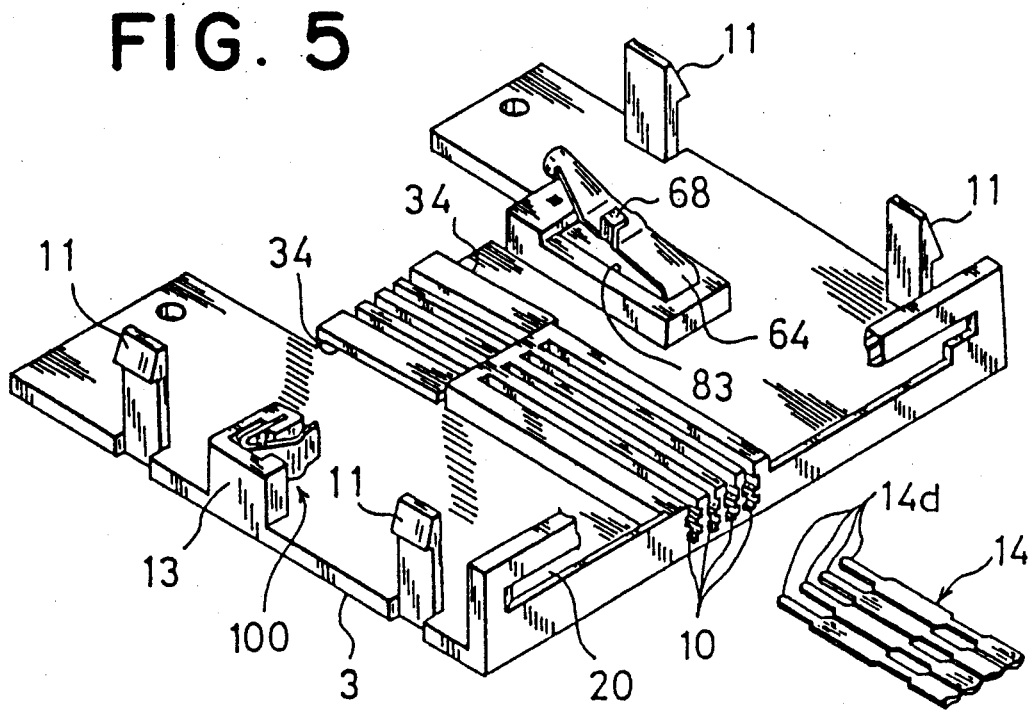
FIG. 5 is a perspective view of the inside of the upper cover with a spring and contact pieces assembled.

The slider 5 is provided at the front end thereof with a concave 31 and on the top thereof with hook-shape engagement portions 32. As shown in FIG. 6A and FIG. 6B, the slider 5 is provided at the underside thereof with two arcuate cam surfaces 33 which are gradually lowered in a direction toward the front end of the slider 5. The cam surfaces 33 are respectively formed at the left- and right-hand of the slider 5. The slider 5 is held by the upper cover 3 in a manner slidable in the front-to-back direction by fitting the engagement portions 32 of the slider 5 into guide portions 34 having an L-shape section or a reverse L-shape section as shown in FIG. 5, which are formed in the upper cover 3. The slider 5 is provided at both ends thereof with spring receiving seats 35. As shown in FIG. 2, coil springs 36 are respectively disposed between the seats 35 and the rear wall of the upper cover 3. The slider 5 is biased normally forward by the coil springs 36. Also, the slider 5 has spring holding projections 37. The advance position of the slider 5 is regulated by engagement portions 22, as shown in FIG. 6A and FIG. 6B, which are formed in the upper cover 3 and which are engaged with the short contact pieces 15.

The lifting and lowering member 6 is provided in both ends thereof with substantially U-shape holes 41. The body 2 has right- and left-hand poles 51. By fitting these poles 51 into the holes 41 in the lifting and lowering member 6, the member 6 is vertically movably assembled with the body 2. Torsion coil springs 53 are disposed between the lifting and lowering member 6 and the bottom of the body 2 at right- and left-hand thereof. The torsion coil springs 53 are formed such that, when both ends of each torsion coil spring 53 are pushingly opened, there is produced a spring-load for closing these ends. The torsion portions are held by the projections 24 of the swing member 4, and the one ends of the torsion coil springs 53 are secured to the body 2 while the other ends are engaged with the upper side of the lifting and lowering member 6. Accordingly, the torsion coil springs 53 apply spring-loads for normally pushing down the lifting and lowering member 6. Therefore, the one swing end 26 of the swing member 4 is pushed down by the spring-loads of the torsion coil springs 53, as shown in FIG. 6A. This causes the other swing end 27 to be pushed upward such that the same follows the cam surface 33 of the slider 5.

Figure 7:
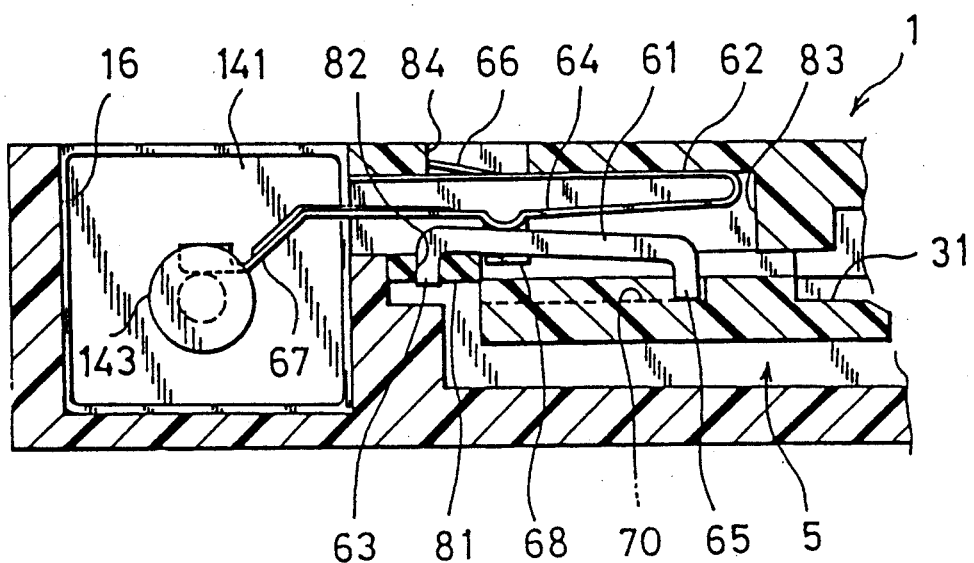
FIG. 7 is a section view of main portions of the card connector of FIG. 1, illustrating the state where the slider is held at a retreat position by an engagement pin.

The lock mechanism 7 is a so-called heart cam mechanism including an engagement pin 61, a spring 62 and a guide groove 70 formed in the top surface of the slider 5. As shown in FIG. 7, the lock mechanism 7 is disposed between the upper cover 3 and the slider 5.

More specifically, the pin 61 is provided at the base side thereof with a turned portion 63. This turned portion 63 is inserted in and held by a hole 82 formed in a projection 81 of the body 2. As shown in FIG. 5, the spring 62 is held by a holding concave 83 formed in the upper cover 3. The pin 61 has an downwardly turned portion 65 which is downwardly biased by a tongue piece 64 of the spring 62. This downwardly turned portion 65 is inserted into the guide groove 70 of the slider 5. By a claw 66, the spring 62 is hooked in an engagement hole 84 formed in the upper cover 3. It is noted that the guide groove 70 formed in the slider 5 has a closed loop.

Figure 8A:
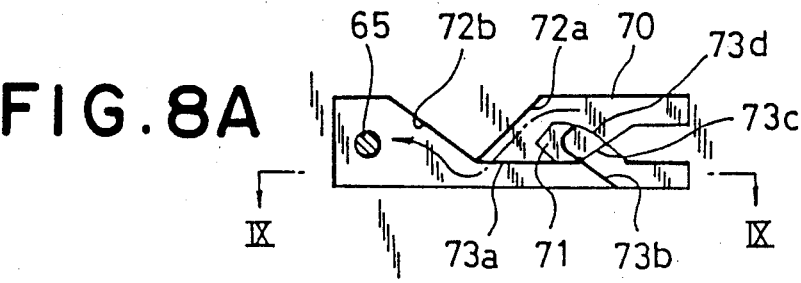
FIG. 8A to FIG. 8C are views illustrating a lock mechanism.
Figure 8B:
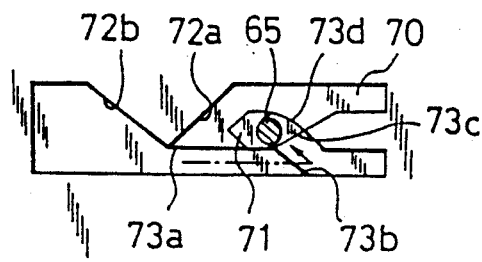
Figure 8C:
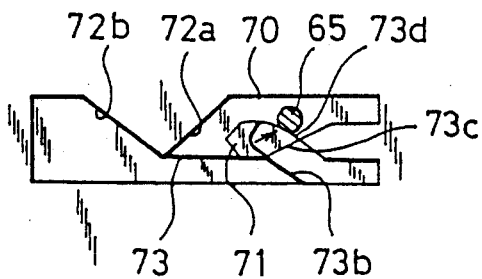
Figure 9:
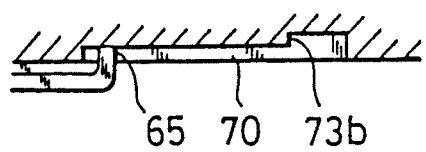
FIG. 9 is a section view taken along the line IX—IX of FIG. 8A.

As shown in FIG. 8A to FIG. 8C, the guide groove 70 includes a heart-shape engagement portion 71, guide surfaces 72a, 72b forming a V-shape, and four stepped portions 73a, 73b, 73c, 73d formed in the closed loop. Where a card is not being inserted, the turned portion 65 of the engagement pin 61 is located at the rear end outside of the closed loop of this guide groove 70 as shown in FIG. 8A. The stepped portions 73a, 73b, 73c, 73d are formed such that, with the movement of the slider 5 achieved at the time of card insertion and removal, the turned portion 65 is relatively moved only in such direction as to intersect the stepped portions 73b, 73c, 73d and 73a in this order such that the turned portion 65 is returned to the position shown in FIG. 8A, and the turned portion 65 is prevented from being relatively moved in the direction opposite to the direction above-mentioned, at any of the stepped portions.

Figure 10:
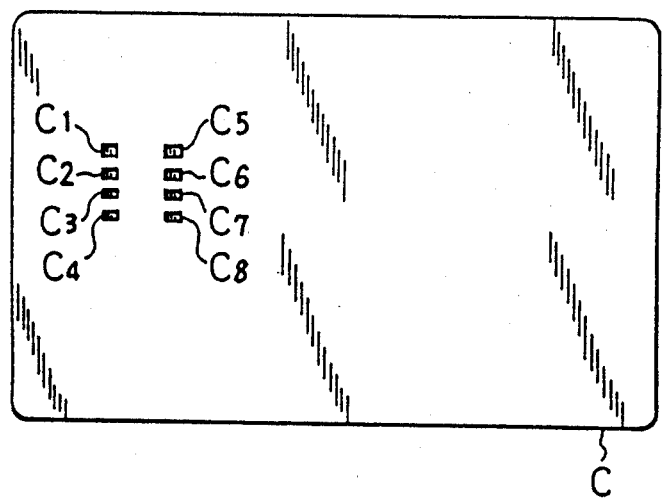
FIG. 10 is a plan view of a card.

FIG. 10 shows an example of the card C, which has eight external terminals $C_1$ to $C_8$ arranged in two rows in the longitudinal direction of the card C, i.e., in the direction in which the card C is inserted in and removed from the connector.

In addition to the basic arrangement above-mentioned, the card connector in this embodiment also has card detector means 100, card posture judging means 120 and an actuator 140.

The card detector means 100 is adapted to detect that the card has been inserted into the set position. As shown in FIG. 2, the card detector means 100 includes a stationary contact piece 111 and a movable contact piece 112. The stationary contact piece 111 is held by the body 2 or the upper cover 3 of the connector body 1, while the movable contact piece 112 is held by a holding frame 13 of the upper cover 3. When the card C is inserted into the set position, a turned portion 113 in the form of a mountain connected to the movable contact piece 112 is pushed by the end surface of the card C. This causes the movable contact piece 112 to be separated from the stationary contact piece 111. Accordingly, where the card C is not being inserted or where the card C does not reach the set position even though the card C is inserted, the movable contact piece 112 comes in contact with the stationary contact piece 111. The stationary contact piece 111 and the movable contact piece 112 have lead portions 114, 115, respectively.

Figure 11:
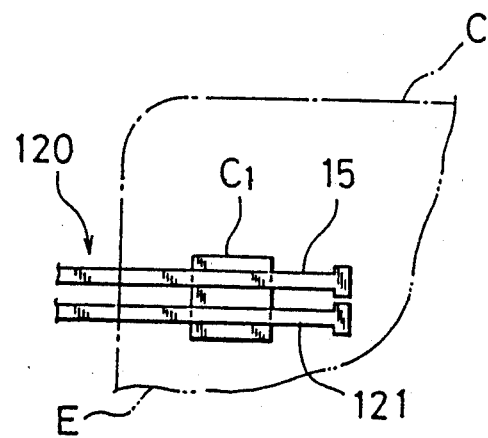
FIG. 11 is a view illustrating an example of card posture judging means.

The card posture judging means 120 is adapted to check whether or not the card C is in a normal posture, after the insertion of the card C into the set position has been detected by the card detector means 100. As shown in FIG. 11, the card posture judging means 120 in this embodiment is formed by dividing the contact piece 15 for a specific external terminal of the card C, for example the power terminal $C_1$, thereby to form a divided contact piece 121. Provision is made such that, when the contact piece 15 and the divided contact piece 121 are short-circuited at the common terminal also serving as the power terminal $C_1$, a card normal posture signal is generated in a connector-side circuit. Accordingly, if the normal posture signal is not generated even though the insertion of the card into the set signal is detected by the card detector means 100, it may be judged that the card is not in the normal posture.

The actuator 140 is adapted to disengage the engagement pin 61 engaged with the guide groove of the lock mechanism 7, from the engagement groove 70, when it is detected based on the judging result of the card posture judging means 120 that the card C has not been inserted in the normal posture. The actuator 140 shown in FIG. 12 has an electromagnetic solenoid 141 having a plunger 142, and a cam 143 formed at the tip of the plunger 142, the cam 143 having a valley portion 143a and a mountain portion 143b. A working piece 67 extended from a tongue piece 64 of the spring 62 is opposite to the cam 143. In the actuator 140 shown in FIG. 2, the electromagnetic solenoid 141 is housed in a concave 16 formed in the rear end of the body 2, and the working piece 67 follows the cam 143 of the plunger 142. The working piece 67 has an arcuate tip in the form of a circular arc to reduce the contact surface thereof with the cam 143. This assures a smooth operation of the working piece 67 when the plunger 142 is moved. FIG. 5 and FIG. 7 also show an engagement piece 68 formed integrally with the tongue piece 64, which is engaged with the engagement pin 61.

The following description will discuss the operation of the card connector.

As shown in FIG. 6A and FIG. 6B, a card inserting and removing passage is formed by the concave 31 of the slider 5 and by a space on the top of the lifting and lowering member 6 inside of the connector body 1 having the body 2 and the upper cover 3. Accordingly, the card C is to be inserted and removed through the card inserting and removing port 20 in the body 2.

Where the card C is not being inserted into the card inserting and removing passage, the lifting and lowering member 6 is pushed down by the spring loads of the torsion coil springs 53, and the slider 5 is pushed toward the card inserting and removing port 20 by the spring loads of the coil springs 36, as shown in FIG. 6A. The contacts 14c of the long contact pieces 14 and the contacts 15c of the short contact pieces 15 are held as regulated in position with the expanding portions 14b, 15b hooked on the stepped portions 17. These contacts 14c, 15c are opposite to the card inserting and removing passage with a space provided therebetween. Accordingly, even though the card C is inserted into the card inserting and removing passage through the card inserting and removing port 20 in the body 2 as shown in FIG. 6A (See the virtual lines in FIG. 2), there is no possibility of the contacts 14c, 15c coming in contact with the surface or the external terminals $C_1, C_2, \ldots C_8$ of the card C.

When the card C pushes a standing surface 31a of the concave 31 of the slider 5 from the position shown in FIG. 6A, the slider 5 is pushed from the advance position in FIG. 6A to the retreat position in FIG. 6B against the spring loads of the coil springs 36. When the slider 5 is pushed in this manner, the turned portion 65 of the engagement pin 61 engaged with the rear-end portion of the guide groove 70 is relatively moved toward the stepped portion 73b of the guide groove 70 and then intersects the same as shown in FIG. 8A. When the pushing force applied to the slider 5 is released at this time, the slider 5 tends to return toward the card inserting port 20 by the spring loads of the coil springs 36. However, the turned portion 65 cannot traverse the stepped portion 73b in the reverse direction. Accordingly, the turned portion 65 intersects the stepped portion 73c and is locked as engaged with the engagement portion 71 as shown in FIG. 8B. Thus, the slider 5 is held at the retreat position as shown in FIG. 6B.

At the same time, the movable contact piece 112 is pushed by the end surface E of the card C, causing the movable contact piece 112 to be separated from the stationary contact piece 111, as shown in FIG. 2. Thus, the insertion of the card C into the set position is detected.

At the same time, as the slider 5 is pushed as abovementioned, the other swing end 27 of the swing member 4 is gradually pushed down by the cam surface 33 of the slider 5. When the slider 5 reaches the retreat position, the other swing end 27 becomes opposite to the lowermost position of the cam surface 33. Accordingly, the one swing end 26 of the swing member 4 is gradually pushed up as the other swing end 27 is pushed down. Thus, the swing end 26 is moved toward the contacts 14c, 15c. Under such action of the swing member 5, the lifting and lowering member 6 is pushed up against the spring loads of the torsion coil springs 53. This causes the card C to be pushed up such that the external terminals $C_1, C_2 \ldots C_8$ of the card C are pressingly contacted with the corresponding contacts 14c, 15c, respectively. When the card C is pushed up by the lifting and lowering member 6, the contacts 14c, 15c are pushed up against the pre-loads applied to the contact pieces 14, 15. Accordingly, the contacts 14c, 15c are strongly resiliently contacted with the external terminals $C_1, C_2 \ldots C_8$, respectively, thus assuring electrical conduction. It is immediately before the slider 5 perfectly reaches the retreat position that the external terminals $C_1, C_2 \ldots C_8$ come in contact with the contacts 14c, 15c for the first time. Accordingly, the contacts 14c, 15c slightly rub against the external terminals $C_1, C_2 \ldots C_8$. However, such rubbing is advantageous in view of selfcleaning of the external terminals $C_1, C_2 \ldots C_8$, and is therefore preferable.

At the same time when the external terminals $C_1, C_2 \ldots C_8$ are pressingly contacted with the corresponding contacts 14c, 15c, respectively, the divided contact piece 121 of the contact piece 15 is pressingly contacted with the external terminal $C_1$ as shown in FIG. 11. When the divided contact piece 121 is pressingly contacted with the external terminal $C_1$, this means that the card C is in the normal posture, i.e., the card C has not been erroneously inserted. In such case, it is enough to make provision such that the electromagnetic solenoid 141 is not actuated and that the working piece 67 follows the valley portion 143a of the cam 143.

Figure 12:
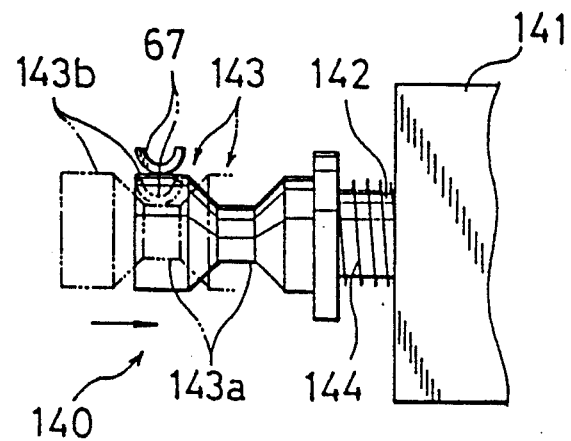
FIG. 12 is a view of an example of an actuator.

If the card C has been inserted with the wrong side up or with the rear end first, the contact piece 15 corresponding to the external terminal $C_1$ is not short-circuited with the divided contact piece 121. Accordingly, the card posture judging means 120 detects that the card has not been inserted in the normal posture, i.e., the card has been erroneously inserted. In such case, provision is made such that the electromagnetic solenoid 141 is actuated and the plunger 142 is pulled in against the spring load of the spring 144. In this case, as shown in FIG. 12 the working piece 67 is pushed up by the mountain portion 143b of the cam 143 formed at the tip of the plunger 142. This causes the turned portion 65 of the engagement pin 61 shown in FIG. 7, to be disengaged from the engagement portion 71 of the guide groove 70. Thus, the lock state of the slider 5 is released. Accordingly, the slider 5 is pushed out to the advance position by the spring loads of the coil springs 36, and a portion of the card C is discharged from the card inserting and removing port 20.

When discharging the card C inserted in the normal posture, the card C is pushed in again from the state shown in FIG. 6B. Then, the turned portion 65 of the pin 61 in the lock mechanism 7 is disengaged from the engagement portion 71 of the guide groove 70 and relatively moved in such direction as to traverse the stepped portion 73d, as shown in FIG. 8C. At this time, the turned portion 65 cannot traverse the stepped portion 73C from the engagement portion 71.

When the turned portion 65 has traversed the stepped portion 73d, the lock state of the lock mechanism 7 is released. Accordingly, the slider 5 is pushed from the retreat position to the advance position by the spring loads of the coil springs 36. This causes the turned portion 65 to be moved to the initial position as shown in FIG. 8A. The other swing end 27 of the swing member 4 is separated from the cam surface 33, so that the lifting and lowering member 6 is lowered by the spring loads of the torsion coil springs 53 as shown in FIG. 6A. Accordingly, as pushed by the slider 5, a portion of the card C is discharged from the card inserting and removing port 20 with the external terminals $C_1, C_2 \ldots C_8$ of the card C separated from the contacts 14c, 15c. The self-cleaning above-mentioned is also carried out instantaneously when the external terminals $C_1, C_2 \ldots C_8$ are separated from the contacts 14c, 15c.

According to the card connector above-mentioned, there is no likelihood that any of the external terminals $C_1, C_2 \ldots C_8$ comes in contact with the contact 14c or 15c, or the contact piece 121 when the card C is inserted or removed, even though some of the external terminals $C, C_2 \ldots C_8$ of the card C are arranged in the card inserting and removing direction. This advantageously prevents the external terminals $C_1, C_2 \ldots C_8$ from being short-circuited with the contact piece 121 or the contacts 14c, 15c which are not respectively corresponding.

Figure 13:
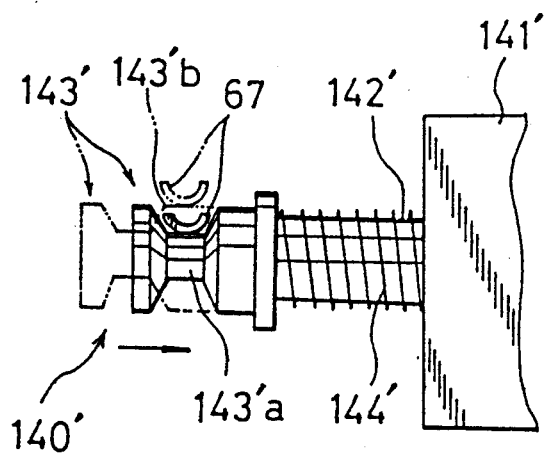
FIG. 13 is a view of an example of the actuator used in a card connector in accordance with a second embodiment of the present invention.

FIG. 13 shows an actuator 140' of the card connector in accordance with the second embodiment of the present invention.

Except the actuator, the card connector of the second embodiment has the same arrangement as in the card connector of the first embodiment. The detailed description of the arrangement is therefore omitted here. It is however noted that the card connector of the second embodiment is not provided with the card detector means 100 having the stationary contact piece 111 and the movable contact piece 112, as done in the first embodiment.

The actuator 140' is adapted to hold the engagement pin 61 as disengaged from the guide groove 70 of the lock mechanism 7, when it has been judged by the card posture judging means 120 described in the card connector of the first embodiment that the card C has not been inserted in the normal posture.

More specifically, the actuator 140' in FIG. 13 has an electromagnetic solenoid 141', a plunger 142' and a cam 143' formed at the tip of the plunger 142'. The cam 143' has a valley portion 143'a and a mountain portion 143'b which are respectively located in the positions of the mountain portion 143a and the valley portion 143b of the actuator 140 mentioned earlier. Accordingly, provision may be made such that, when the divided contact piece 121 of the card posture judging means 120 is not short-circuited with the contact piece 15, i.e., when the card C is not being inserted or the card C has been erroneously inserted, the electromagnetic solenoid 141' is not actuated. Accordingly, the working piece 67 is held as pushed up by the mountain portion 143'b of the cam 143' as shown by virtual lines in FIG. 13. In such arrangement, even though the card C is inserted into the set position, the turned portion 65 of the engagement pin 61 is not engaged with the guide groove 70 of the slider 5. When the pushing force is released, the card C may be immediately discharged with the advancement of the slider 5 by the spring loads of the springs 36.

On the other hand, provision may be made such that, when the divided contact piece 121 of the card posture judging means 120 is short-circuited with the contact piece 15, i.e., when it is judged that the card C has been inserted in the normal posture, the electromagnetic solenoid 141' is actuated so that the plunger 142' is pulled in against the spring load of a spring 144' as shown in FIG. 3. This causes the valley portion 143'a of the cam 143' to be opposite to the working piece 67, as shown by the solid lines in FIG. 13. Accordingly, the working piece 67 is lowered along the valley portion 143'a and the turned portion 65 of the engagement pin 61 is engaged with the guide groove 70 of the slider 5 pushed to the set position. Further, since the slider 5 has been already located in the set position, the turned portion 65 is engaged with the engagement portion 71 of the guide groove 70. This causes the slider 5 to be maintained at the retreat position. The card C thus held at the retreat position may be pulled out in the same manner as done in the card connector of the first embodiment.

Figure 14:
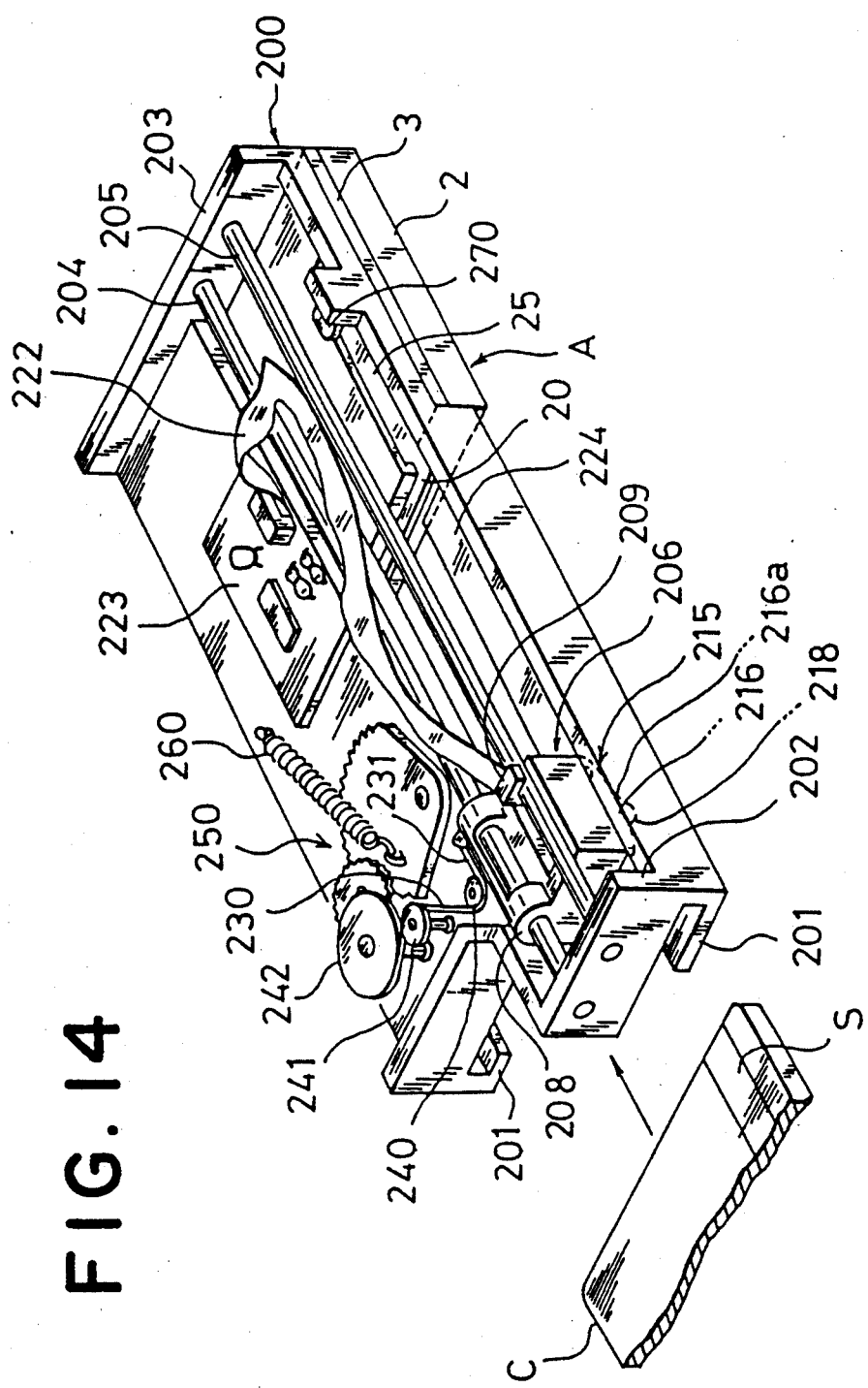
FIG. 14 is a schematic perspective view of a card connector provided with a magnetic head travelling mechanism in accordance with a third embodiment of the present invention.

FIG. 14 shows a card connector A having a magnetic head travelling mechanism in accordance with a third embodiment of the present invention.

Figure 15:
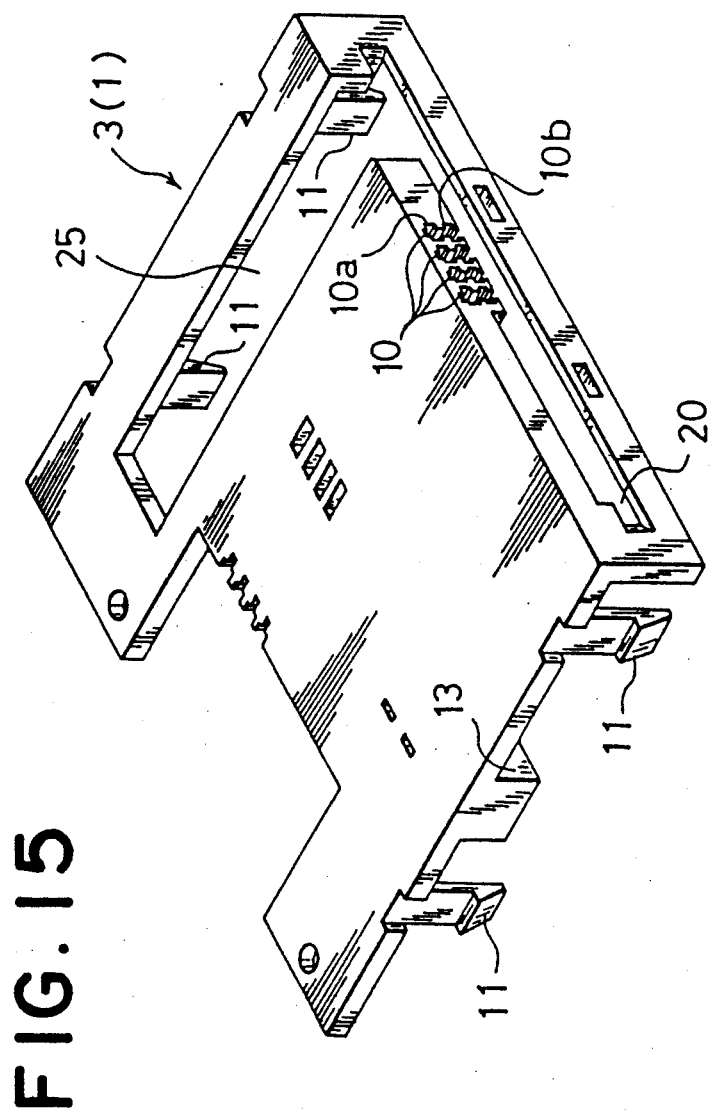
FIG. 15 is a perspective view of the upper cover of the connector body.

The card connector A having the magnetic head travelling mechanism has an upper cover 3' provided with an opening 25, as shown in FIG. 15, which overlaps an opening 224 of a frame 200 of the magnetic head travelling mechanism to be discussed later. Provision is made such that a card inserting and removing passage of the card connector A is formed downstream of a card inserting and removing passage of the magnetic head travelling mechanism, both passages being continuous.

As shown in FIG. 14, the frame 200 of the magnetic head travelling mechanism is provided in the lower front side thereof with a pair of left- and right-hand engagement grooves 201. The card inserting and removing passage is formed between these engagement grooves 201. The engagement grooves 201 are not formed in the lower rear side of the frame 200 which is opposite to the upper cover 3' in the front-to-back direction thereof. It is therefore apparent that the card inserting and removing passage is not formed in this lower rear side of the frame 200.

Figure 16:
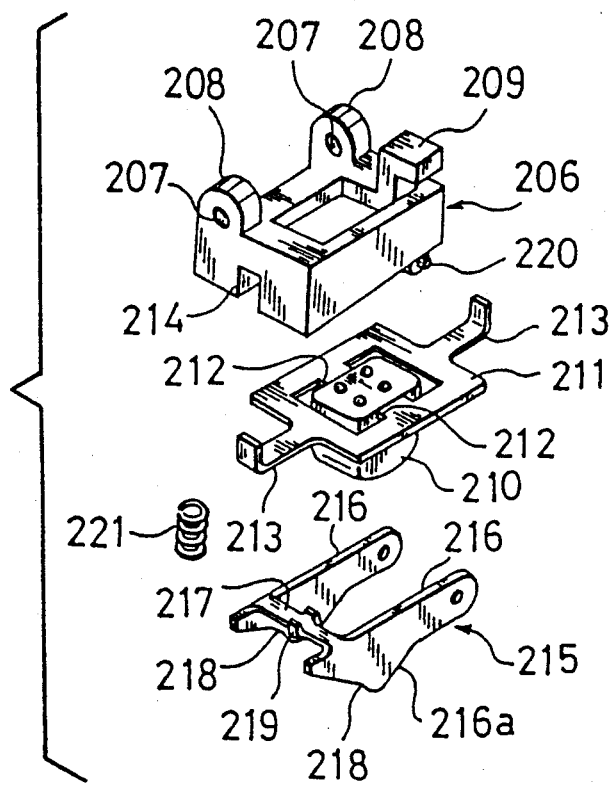
FIG. 16 is an exploded perspective view mainly showing a magnetic head and a travelling body in the card connector of FIG. 14.

Parallel two guide rods 204, 205 are disposed between a front wall 202 and a rear wall 203 of the frame 200. A travelling body 206 includes brackets 208 having through-holes 207, and a hook-shape engagement piece 209, as shown in FIG. 16. As shown in FIG. 14, one guide rod 204 is fitted in the through-holes 207, while the other guide rod 205 is engaged with the engagement piece 209. In FIG. 16, a magnetic head 210 is connected to a pair of projections 212 formed integrally with a rectangular frame-shape spring plate 211. The spring plate 211 has a pair of outwardly extending support pieces 213. By engaging these support pieces 213 with a concave groove 214 of the travelling body 206, the magnetic head 210 is mounted on the travelling body 206 through the spring plate 211.

Figure 17:
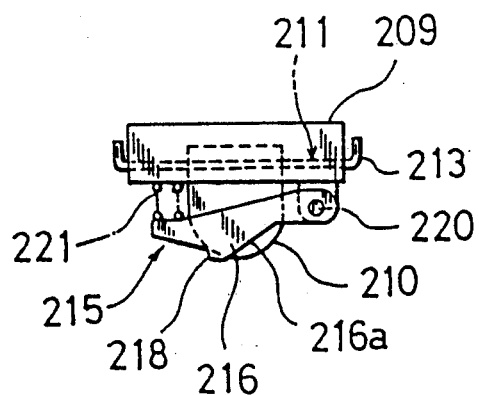
FIG. 17 is an assembling side view of FIG. 15.

A control member 215 has a pair of right- and left-hand legs 216, and a connecting member 217 connecting these legs 216 at the front ends thereof. The legs 216 are provided at the front lower ends thereof with stepped engagement ends 218. The connecting member 217 is provided at the center thereof with a spring receiving projection 219. The control member 215 is swingingly attached to the travelling body 206 with the use of projections 220 of the travelling body 206 at the lower rear end thereof. As shown in FIG. 17, a spring 221 is disposed between the travelling body 206 and the connecting member 217.

As shown in FIG. 14, the magnetic head 210 is connected to a printed circuit board 223 disposed on the frame 200 by a flexible printed board 222. The magnetic head 210 faces on the card inserting and removing passage and the rear portion thereof through the opening 224 in the frame 200.

In FIG. 14, a wire 230 lead from the travelling body 206 has a leading starting end 231 parallel with the guide rods 204, 205. With the intermediate portion of the wire 230 wound on a turning pulley 240, the wire 230 is turned. Through an intermediate pulley 241, the wire 230 is wound on a take-up pulley 242 by about one revolution. The terminal end of the wire 230 is secured to this take-up pulley 242.

Figure 18:
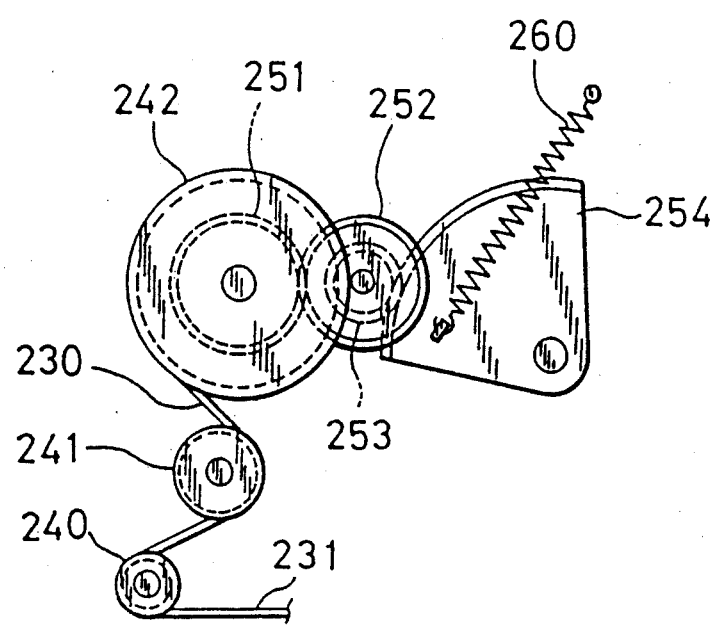
FIG. 18 is a view illustrating a reduction gear mechanism.

As shown in FIG. 18, a reduction gear mechanism 250 has a gear 251 secured coaxially with the take-up pulley 242, a gear 252 meshed with the gear 251 and having a diameter equal to or substantially equal to that of the gear 251, a small-diameter gear 253 secured coaxially with the gear 252, and a large-diameter segment gear 254 meshed with the small-diameter gear 253. A tension coil spring 260 is disposed between one portion of the segment gear 254 and one portion of the frame 200. By the spring load of the tension coil spring 260, the take-up pulley 242 is normally biased in the wire take-up direction through the reduction gear mechanism 250. The tension coil spring 260 is secured to the segment gear 254 such that an even moment of rotation is generated in the segment gear 254 by the spring load of the tension coil spring 260 regardless of the position to which the segment gear 254 has been rotated.

In FIG. 14, a projection 270 is disposed in the vicinity of the forward movement limit of the travelling body 206. This projection 270 is opposite to rear-end inclined surfaces 216a of the legs 216 of the control member 215. The projection 270 is an example of means for releasing the engagement of the engagement ends 218 with the end surface of the card C.

When the magnetic head travelling mechanism having the arrangement above-mentioned is connected to the card connector mentioned earlier with the stepped portion of the frame 200 coming in contact with the front end of the card connector as shown in FIG. 14, the opening 25 formed in the upper cover 3 of the card connector is adapted to be opposite to the opening 224 in the frame 200 and both card inserting and removing passages are continuous. Accordingly, the magnetic head 210 may continuously face on the card inserting and removing passage of the magnetic head travelling mechanism and the card inserting and removing passage of the card connector. The card connector A and the magnetic head travelling mechanism may be connected to each other by connecting the body 2 or the upper cover 3 of the card connector A to the frame 200 of the magnetic head travelling mechanism with engagement pieces formed in one member engaged with engagement grooves formed in the other member. Alternately, both members may be connected to each other with securing means such as adhesion or fusion-bond, or may be connected as individually attached to the casing of apparatus in which these members are installed.

Figure 19A:
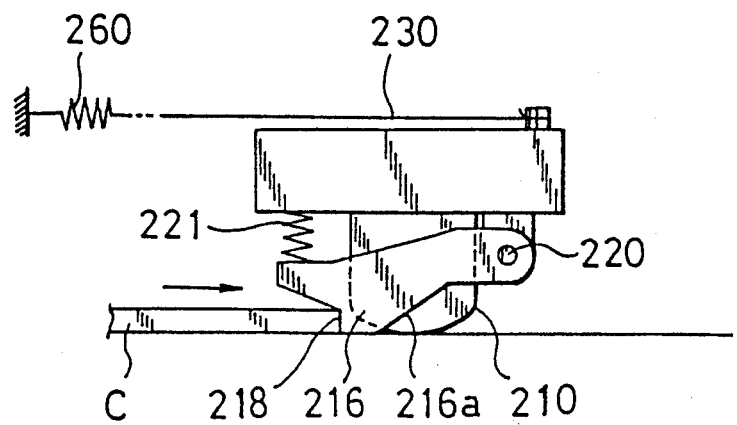
FIGS. 19A to FIG. 19D are views illustrating the operation of the magnetic head travelling mechanism.
Figure 19B:
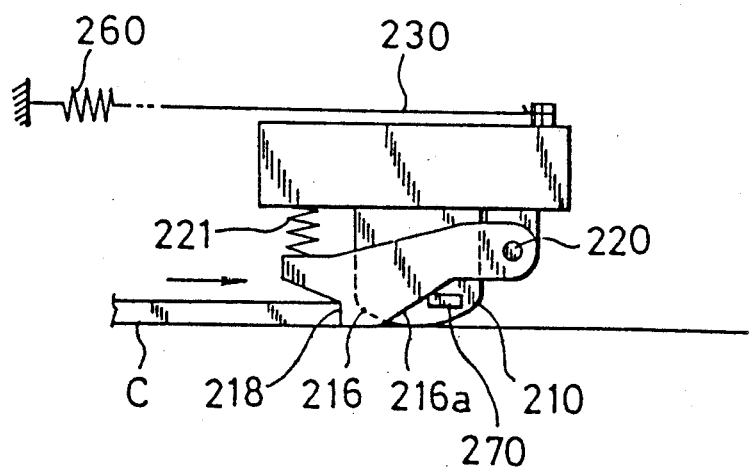
Figure 19C:
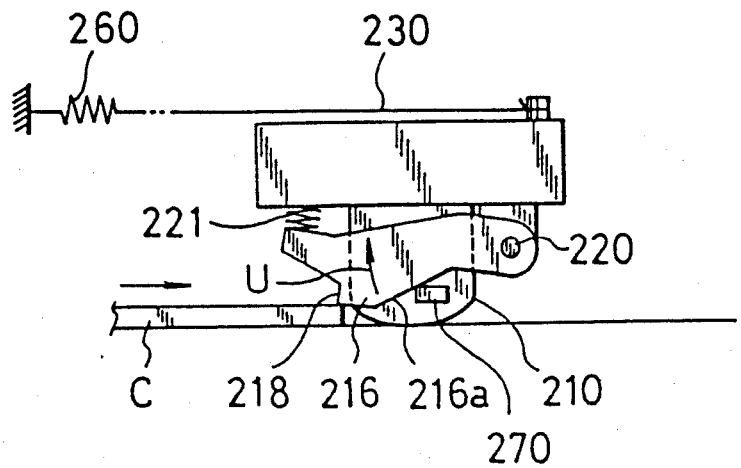
Figure 19D:
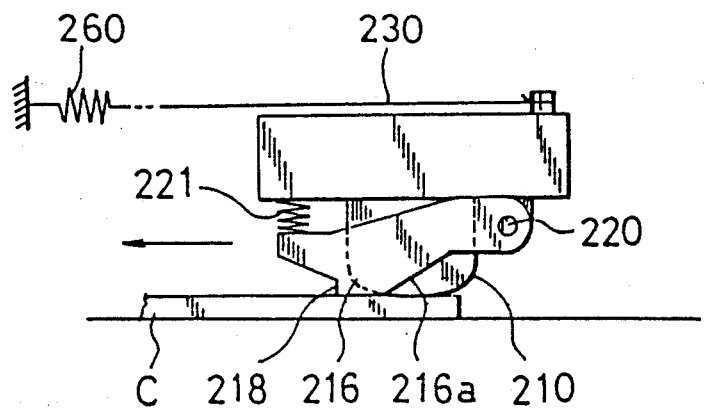

When the card C having a magnetic strip S is inserted into the card inserting and removing passage of the magnetic head travelling mechanism between the engagement grooves 201 as shown by an arrow in FIG. 14, the travelling body 206 is forwardly moved with the end surface of the card C engaged with the engagement ends 218 of the legs 216 as shown in FIG. 19A. When the card C enters the card inserting and removing passage of the card connector and the travelling body 206 reaches a position in the vicinity of the forward movement limit thereof, the rear-end inclined surfaces 216a of the legs 216 come in contact with the projection 270 as shown in FIG. 19B. Then, with the forward movement of the travelling body 206, the legs 216 are pushed up against the spring load of the spring 221 shown by an arrow U while the projection 270 slides along the rear-end inclined surfaces 216a, as shown in FIG. 19C. When the engagement of the engagement ends 218 with the end surface of the card C is released, the travelling body 206 is returned, as shown in FIG. 19D, by the spring load applied to the travelling body 206 through the reduction gear mechanism 250 and the wire 230. At this time, the magnetic head 210 scans the magnetic stripe S of the card C. While the magnetic head 210 scans the magnetic stripe S, the spring plate 211 is bent. Force corresponding to the reaction force of the spring plate 211 causes the magnetic head 210 to scan the magnetic stripe S. When the card C enters the card inserting and removing passage of the card connector A, the card connector A is operated in the same manner as in the card connector described with reference to FIG. 1. That is, if the card C is not in the normal posture, the card C is discharged.

What is claimed is:

1. In a card connector having a slider adapted to be pushed from the advance position into the retreat position thereof by a card when the card is inserted into a set position along a card inserting and removing passage, an engagement pin adapted to be engaged with said slider to hold the same at said retreat position, and springs for normally biasing said slider in the advancing direction, said card connector comprising:

card detector means for detecting that the card has been inserted into said set position;

card posture judging means for detecting that the card is not in a normal posture after the insertion of the card into said set position has been detected by said detector means; and an actuator for disengaging said engagement pin from said slider if said card posture judging means detects that the card has not been inserted in said normal posture.

2. In a card connector having a slider adapted to be pushed from the advance position into the retreat position thereof by a card when the card is inserted into a set position, an engagement pin adapted to be engaged with said slider to hold the same at said retreat position, and springs for normally biasing said slider in the advancing direction, said card connector comprising:

card posture judging means for detecting that the card inserted into said set position is not in a normal posture; and an actuator for holding said engagement pin as disengaged from said slider if said card posture judging means detects that the card has not been inserted in said normal posture.

3. A card connector as set forth in claim 1, further comprising a magnetic head travelling mechanism which comprises:

a travelling body held by guide rods in a forwardly and reversely movable manner;

a magnetic head attached to said travelling body through a spring plate;

a card inserting and removing passage for a card with a magnetic stripe, said passage being adapted to face on the scanning plane of said magnetic head formed at the time when said travelling body travels;

a wire having a leading starting end parallel with said guide rods, said wire being lead from said travelling body;

a turning pulley on which said wire is wound at the intermediate portion thereof, causing said wire to be turned;

a take-up pulley on which said wire is wound at the terminal end thereof and to which said terminal end is secured;

a gear reduction mechanism connected to said take-up pulley;

a resilient member for biasing said take-up pulley in the wire take-up direction through said gear reduction mechanism;

a control member swingingly held by said travelling body and having engagement ends adapted to be engaged with the end surface of the card inserted into said card inserting and removing passage; and means disposed in the vicinity of the forward movement limit of said travelling body for pushing up said control member to disengage the engagement ends thereof from the card end surface, said card inserting and removing passage of said magnetic head travelling mechanism being continuous on the card inserting and removing passage of said card connector.

4. A card connector as set forth in claim 2, further comprising a magnetic head travelling mechanism which comprises:

a travelling body held by guide rods in a forwardly and reversely movable manner;

a magnetic head attached to said travelling body through a spring plate;

a card inserting and removing passage for a card with a magnetic stripe, said passage being adapted to face on the scanning plane of said magnetic head formed at the time when said travelling body travels;

a wire having a leading starting end parallel with said guide rods, said wire being lead from said travelling body;

a turning pulley on which said wire is wound at the intermediate portion thereof, causing said wire to be turned;

a take-up pulley on which said wire is wound at the terminal end thereof and to which said terminal end is secured;

a gear reduction mechanism connected to said take-up pulley;

a resilient member for biasing said take-up pulley in the wire take-up direction through said gear reduction mechanism;

a control member swingingly held by said travelling body and having engagement ends adapted to be engaged with the end surface of the card inserted into said card inserting and removing passage; and means disposed in the vicinity of the forward movement limit of said travelling body for pushing up said control member to disengage the engagement ends thereof from the card end surface, said card inserting and removing passage of said magnetic head travelling mechanism being continuous on the card inserting and removing passage of said card connector.

5. A card connector as set forth in claim 3, wherein the magnetic head travelling mechanism has a frame engaged with and connected to the connector body of said card connector.

6. A card connector as set forth in claim 4, wherein the magnetic head travelling mechanism has a frame engaged with and connected to the connector body of said card connector.

7. A card connector as set forth in claim 3, wherein the magnetic head travelling mechanism has a frame bonded to the connector body of said card connector.

8. A card connector as set forth in claim 4, wherein the magnetic head travelling mechanism has a frame bonded to the connector body of said card connector.

* * * * *